United States Patent [19]

Cowan et al.

[11] Patent Number: 4,469,407
[45] Date of Patent: Sep. 4, 1984

[54] LASER APODIZING FILTER

[75] Inventors: James J. Cowan, Lexington; Andrew B. Holland, Wayland, both of Mass.

[73] Assignee: Polaroid Corporation, Cambridge, Mass.

[21] Appl. No.: 346,930

[22] Filed: Feb. 8, 1982

[51] Int. Cl.³ .............................................. G02B 5/22
[52] U.S. Cl. .................................... 350/314; 350/448; 350/3.7; 350/162.17
[58] Field of Search .................... 350/314, 162.2, 3.67, 350/3.68, 3.7, 448, 162.11, 162.17; 356/256, 432

[56] References Cited

U.S. PATENT DOCUMENTS 3,700,314 10/1972 Busby, Jr. ............................ 350/314
4,094,575 6/1978 Kellie ................................ 350/162.2

FOREIGN PATENT DOCUMENTS 1206035 9/1970 United Kingdom ................. 350/167

OTHER PUBLICATIONS

Smith, *Modern Optical Engineering*, p. 323, McGraw-Hill, N.Y., 1966.
Rhodes, Patrick, W. et al., "Refractive Optical Systems for Irradiance Redistribution of Collimated Radiation: Their Design and Analysis" Applied Optics, vol. 19, No. 20, pp. 3545–3553.
Lee, Wai-Hon, "Method for Converting a Gaussian Laser Beam into a Uniform Beam", Optics Communications, vol. 36, No. 6, pp. 469–471.
Quintanilla, M. et al., "Holographic Filter that Transforms a Gaussian into a Uniform Beam".

Primary Examiner—Bruce Y. Arnold
Attorney, Agent, or Firm—Philip G. Kiely

[57] ABSTRACT

A laser beam apodizing filter comprising a print-out silver image comprised of silver grains having a diameter of about 0.5 μm or less, said image being proportional in density distribution to the intensity distribution of the laser beam cross-section. Also disclosed is a method for forming the filter and a laser diffraction imaging apparatus, for making diffraction gratings, which employs the filter.

16 Claims, 3 Drawing Figures

LASER APODIZING FILTER

BACKGROUND OF THE INVENTION

The preparation of surface relief structures in photosensitive materials is well known. Over the years, the art has learned how to reduce the dimensions of the relief lines or holes (viewed normal to the surface) to the point where they are measured in terms of several microns. This is generally known as micro-fabrication.

In particular, extensive studies have been made of periodic one-dimensional structures prepared in positive type photosensitive materials or photoresists. The photoresist contains a photosensitive polymer which when exposed to light becomes soluble to an appropriate water-based developer. After exposure and development, the initially flat surface of the photoresist becomes a surface relief structure whose depth depends on how much photoresist has been etched away by the developer. When exposed to an intensity variation that is periodic, such as an interference pattern, a periodic surface profile will be formed which is everywhere proportional to the initial interference intensity pattern. Precise relief structures of this type can be made easily over rather large areas using laser interference techniques.

The formation of relief diffraction gratings using laser interference techniques in general involve the exposure of the photoresist to two coherent interfering laser beams. When such beams interfere, there is produced a stationary periodic fringe pattern consisting of maxima and minima of intensity. The spacing between adjacent maxima (or minima) depends upon the optical system used and substantially any spacing can be obtained down to about half the wavelength of the exposing light.

Under usual conditions, the laser is operated under conditions such that there is an approximately Gaussian distribution of intensity across the beam. In other words, the intensity of the laser beam is at a maximum at the center line thereof and is symmetric around the center line and drops off in a radial direction away from the center. In many procedures where photosensitive materials are exposed to laser light, for example, in the formation of holographic gratings by interfering laser beams in photoresist, such a variation of intensity is undesirable because a uniform exposure is required in order to lead to a uniform etch rate in the photoresist. With a Gaussian distribution, the etch rate, and thus the grating groove depth, is always larger at the center than at the edge.

To convert the Gaussian distribution to a more uniform distribution, methods such as using only a small center portion of the laser beam or intercepting the laser beam with an amplitude filter have been employed. However, these methods can cause a significant loss in laser power in the optical system. The art describes a number of these techniques.

Rhodes and Shealy, *Refractive Optical Systems for Irradiance Distribution of Collimated Radiation: Their Design and Analysis*, Applied Optics, Vol. 19, No. 20, pages 3545–3553, October, 1980 describes a plano-aspherical lens system designed to convert the radially symmetric energy distribution of a beam of collimated light into a collimated beam with a constant or uniform intensity distribution.

Quintanilla and deFrutos, *Holographic Filter that Transforms a Gaussian Into a Uniform Beam*, Applied Optics, Vol. 20, No. 5, pages 879–880, March, 1981, describes a volume and phase hologram to provide a coherent light beam of enhanced profile uniformity. They also state that a filter of appropriate density could be constructed by photographing a laser beam, but that it would be necessary to maintain a gamma of unity for the photographic process, and that this is difficult.

Lee, *Method for Converting a Gaussian Laser Beam into a Uniform Beam*, Optics Communications, Vol. 36, No. 6, pages 469–471, March 1981, described an iterative method to provide a phase filter to convert a Gaussian beam into a beam with a more uniform irradiance distribution.

It is accordingly the object of this invention to provide a method and means by which the Gaussian distribution of the laser beam is compensated—for such that the exposure of, e.g., a photoresist to the laser beam in a given area is substantially uniform.

SUMMARY OF THE INVENTION

This invention relates to a laser beam apodizing filter and, more particularly, to a laser beam apodizing filter which comprises an image in terms of silver grains having a diameter of about 0.5 $\mu$m or less, said image being proportional in density distribution to the intensity distribution of said laser beam cross-section. The silver image preferably is formed by a print-out exposure. This invention also relates to the method for forming said apodizing filter and apparatus for using such a filter.

DETAILED DESCRIPTION OF THE INVENTION

Figure 1:
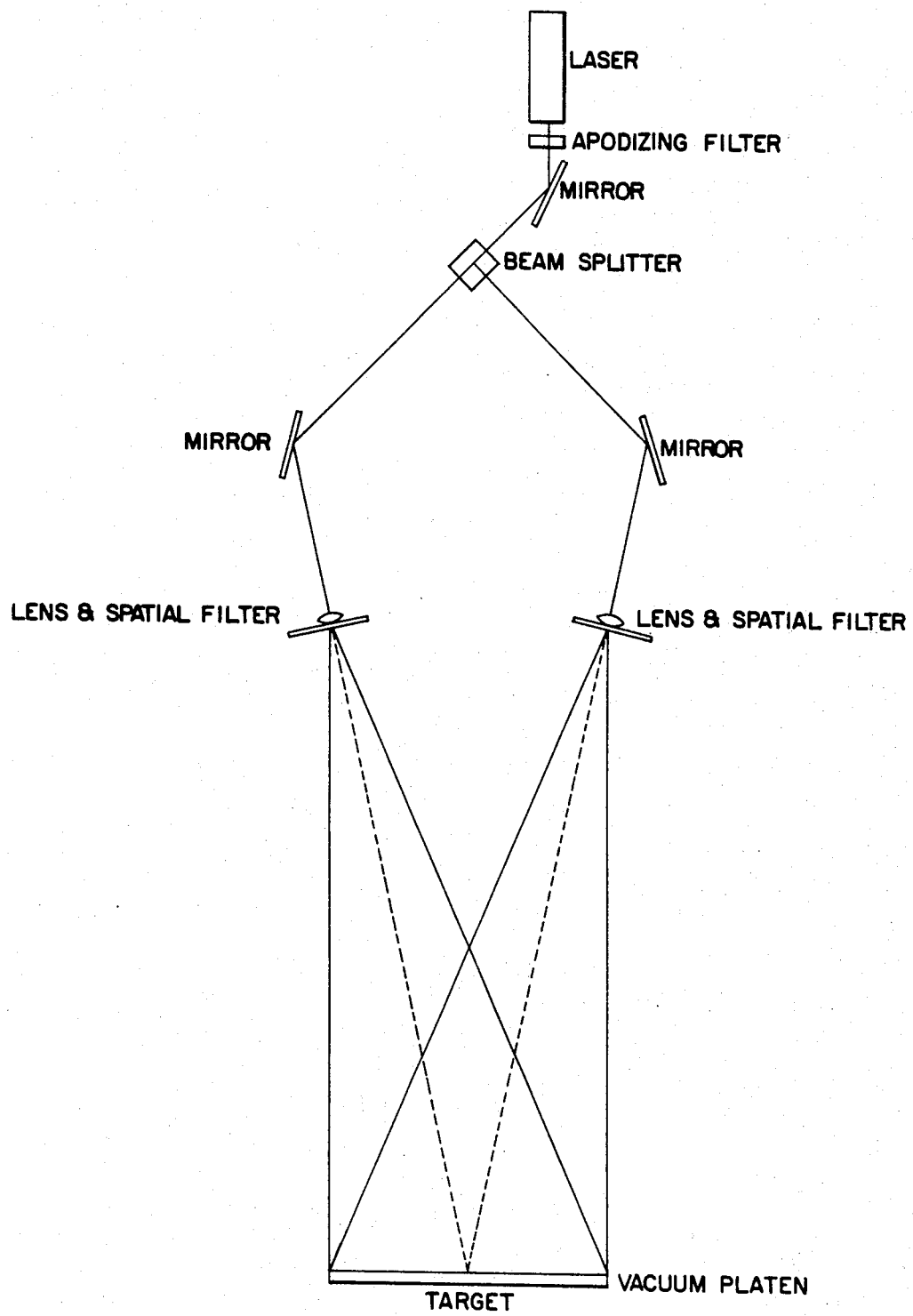
FIG. 1 is a schematic representation of a laser diffraction imaging arrangement.

As stated above, the intensity distribution of the laser beam is approximately Gaussian. That is, the intensity drops off progressively as the distance from the center line of the beam increases. By means of the present invention the intensity distribution of the laser beam is rendered substantially uniform across the desired portion of the cross-section of the beam by interposing in the laser beam, between the laser and the target, an apodizing filter comprising an image in terms of silver grains having a diameter of about 0.5 $\mu$m or less, wherein the density distribution in said image is directly proportional to the intensity distribution of the laser beam cross-section.

In other words, the apodizing filter of the present invention is interposed in the laser beam so that the density distribution of the silver image would have the greatest density in the area of greatest intensity of the laser beam, with the image progressively decreasing in density towards the edge of the laser beam cross-section as the intensity of the laser beam decreases. The density of the silver image is sufficient in the center of the beam to reduce the intensity substantially to the level of the intensity near the edge of the beam where little, if any, filtering will occur. Intermediate the center and the edge the density of the image varies to that a substantially "flat" intensity curve is obtained on the laser beam as it exits the filter, indicating substantially uniform intensity distribution over the entire cross-section of the beam.

The silver image of the apodizing filter is characterized as being composed of silver grains which are about 0.5 μm in diameter or less. This silver image is formed using a fine-grain silver halide emulsion comprising grains which are substantially uniform in diameter and which have a diameter of about 0.5 μm or less. The image is developed under conditions such that the silver grain formed from the exposed silver halide grain is substantially the same size or smaller than the silver halide grain, i.e., there is substantially no enlargement in the grain size. A particularly useful, and presently preferred, method of forming such silver images is by the use of "print-out" silver halide emulsions, the residual unexposed and unreduced silver halide being removed by conventional fixing procedures. The resulting silver grains are the same size or smaller than the original silver halide grains.

Silver halide emulsions useful in practicing this invention are known in the art, and are sometimes referred to a monodisperse emulsions. The silver halide emulsion should have a high silver-to-gel ratio, i.e., greater than 1, and be coated at a thickness of about 1–5 μm. This combination of grain size, silver-to-gel ratio and relatively thin emulsion layer serve to minimize scatter during exposure, particularly during the relatively long exposures employed with print-out silver halide emulsions. In a preferred embodiment, the silver halide emulsion is about 2 μm thick and the average grain size is about 0.4 μm.

In the preferred method for preparing the apodizing filter of the present invention, a fine-grain "print-out" silver halide emulsion carried on any suitable support is positioned in the path of laser light at any suitable point between the laser and the target. The photographic film is preferably positioned upstream of the spatial filter, i.e. between the spatial filter and the laser. The laser is then activated and the laser beam passes through the photographic film. The intensity of the laser beam causes the production of a fine-grain silver image known in the art as "print-out silver". The film is removed and fixed without chemical development so that only the print-out silver remains and the balance of the silver, i.e. that portion which has not been converted into print-out silver, is washed away. The print-out silver in the resulting fixed photographic film is distributed in such a way that its concentration is proportional to the Gaussian intensity of the laser beam which has passed through the film. In other words, the concentration of the print-out silver is greatest along the beam center line and drops off in a radial direction away from the center.

The resulting fixed print-out silver image is replaced in the path of the laser beam and acts as an apodizing filter. The filter is darker at the center than at the edge due to the greater exposure at the center and therefore compensates for the non-uniformity of the laser beam intensity by providing areas of greatest filtering ability where the intensity of the laser beam is the greatest and areas of least filtering ability where the intensity of the laser beam is the least. As a result, the laser beam emerging from the apodizing filter will be relatively flat in intensity distribution. The resulting apodizing filter is particularly appropriate for use in high intensity laser beams because the relatively thin print-out silver image does not absorb appreciable light, but removes light principally by scattering and therefore does not absorb an appreciable amount of heat.

Using a print-out silver halide emulsion provides for better control because of the longer exposure as well as ease of processing and fewer processing steps.

The filter prepared by the above-described procedure can be used directly as an apodizing filter in a laser imaging system or can be used as a master to produce additional filters by conventional developing and printing techniques.

Turning now to FIG. 1, a typical laser interferometer arrangement is shown schematically. Light from the laser source, polarized perpendicular to the plane of incidence, is deflected by a mirror and split by a beam splitter so that half of the light intensity is incident on one mirror and the other half is incident on a second mirror. The light is reflected from each of these mirrors through an expansion lens and a spatial filter such that the expanded beam is incident on the whole target area where a photoresist coated substrate is located. The two intersecting beams, being derived from one coherent source and having traveled along substantially equal paths from the beam splitter, form interference fringes. The spacing between adjacent maxima or minima is equal to one-half of the wavelength of the laser light divided by the sine of the angle of incidence to the target plate of each beam. While the apodizing filter, or a pair of apodizing filters, may be employed at any location in the path of the laser beam, it is preferably located next to the laser, as shown.

The apodizing filter of the present invention is most conveniently made on a plastic, flexible, transparent, non-birefringent film base, e.g., cellulose triacetate, which is laminated, after image formation, between two high optical quality glass plates (i.e., surface polished to a 0.1 wave or better) and bound therebetween with a binder adhesive. Preferably, both the adhesive and support should be refractive index matched to the glass plates. Such an adhesive includes, for example, a clear epoxy. This construction is preferable since it avoids undesirable phase changes in the laser beam wave front due to the inherent thickness variations in the film. Alternatively, the fine-grain emulsion may be coated directly onto an optical quality glass plate.

The following examples describe the preparation of laser apodizing filters within the scope of the present invention. It will be noted in the examples that separate areas in each piece of fine-grain emulsion coating were exposed for varying periods of time. This provides a series of filters, from which one can be selected, as determined by a scan of the laser beam output, to provide the desired profile. A series of filters may be necessary since the laser source may "age", i.e., with the passage of time the intensity distribution of the beam may change, particularly when the laser is new, necessitating matching a filter to the particular distribution.

EXAMPLE 1

CL Preparation of Fine Grain Emulsion
Solution A
    Water: 2000 g
    Inert gelatin: 20 g
Solution B
    Water 860 g
    Potassium bromide 221.6 g
Solution C
    Water: 872.9 g Silver nitrate: 315.0 g Solution B and C were simultaneously jetted into a vessel containing Solution A over a period of 18 min. with the pAg controlled at 9.0. The temperature of Solution A was 38° C. and Solutions B and C were 25° C. After precipitation was complete, 80 g of bulking gelatin was added. The volume-weighted mean grain size, as determined by an electrolytic grain size analyzer was 0.42 μm. The gel to silver ratio was 0.50.

EXAMPLE 2

The fine-grain emulsion of Example 1 was coated on a cellulose triacetate base with a wire-wound rod at a silver coverage of 180 mg/ft$^2$ and dried. The emulsion was placed in the beam from a He—Cd laser with an intensity at the center of the beam of 30 milliwatts and a wavelength of 441.6 nm. Separate sections of the emulsion coating were exposed for 7, 8 and 9 seconds, respectively. The exposed emulsion was fixed with Kodak Fixer for 5 min. at room temperature, washed for 10 min. and dried. The fixed emulsion was sandwiched between 2 sheets of optical quality glass 1 3/32" in diameter and 3/16" thick with TRA-CON 214 clear epoxy (TRA-CON, Inc., Medford, MA). The thus-formed filter was evaluated by placing it in the laser beam and scanning the target with a silicon diode detector. The filters were found to be effective in converting the Gaussian distribution of the beam to a more uniform one.

Figure 2:
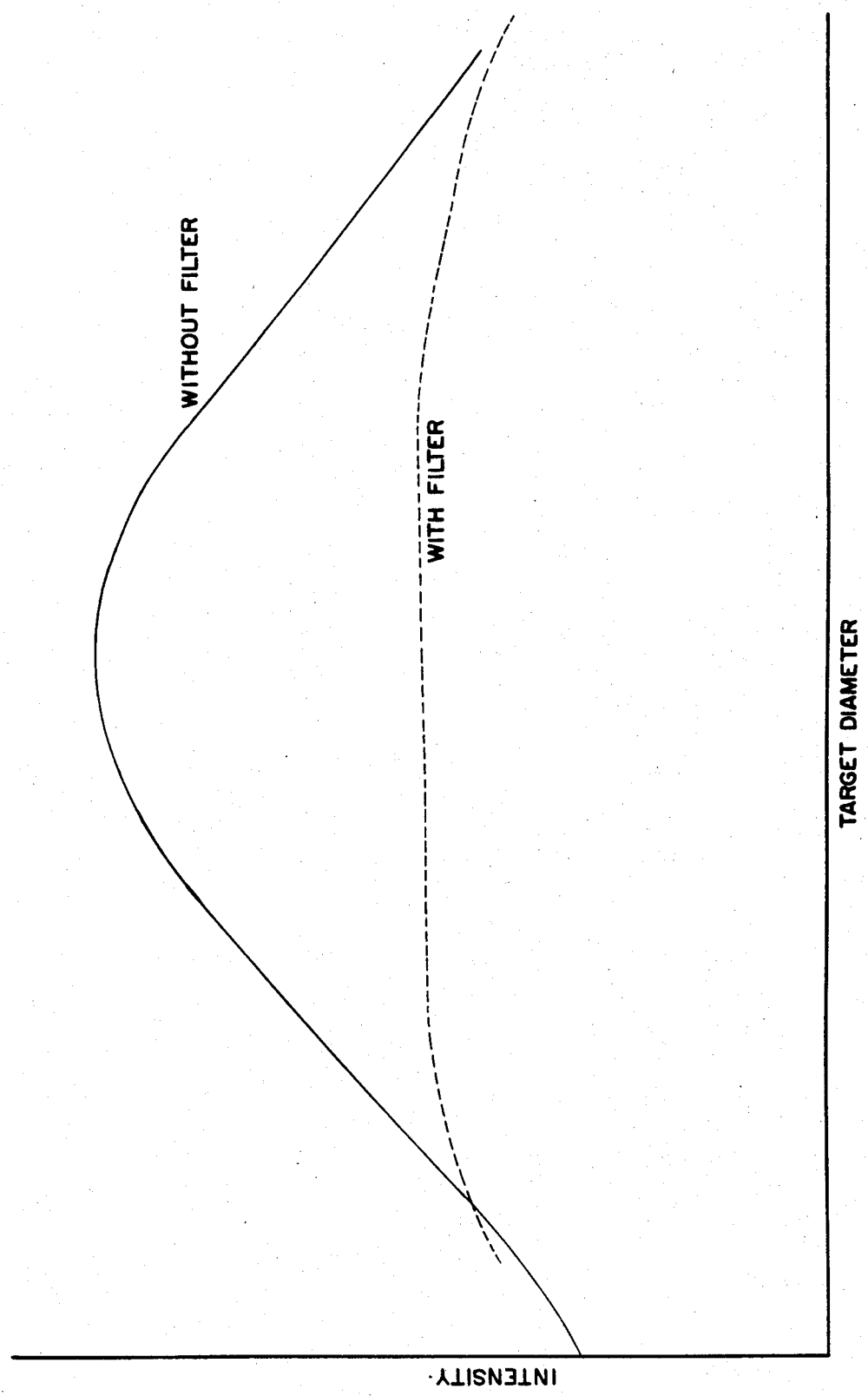
FIG. 2 is a scan of a laser beam profile with a 40X lens with and without an apodizing filter of the present invention.

FIG. 2 is the intensity scan of the laser beam from a 40X lens with and without the filter of the present invention. The lens to target distance was 130 cm. It will be noted that without a filter, the Gaussian distribution is evident. Employing the filter prepared according to the procedure of Example 1 wherein the exposure was 8 sec., the intensity distribution of the beam is flattened, providing a relatively uniform intensity over a large portion of the target.

Figure 3:
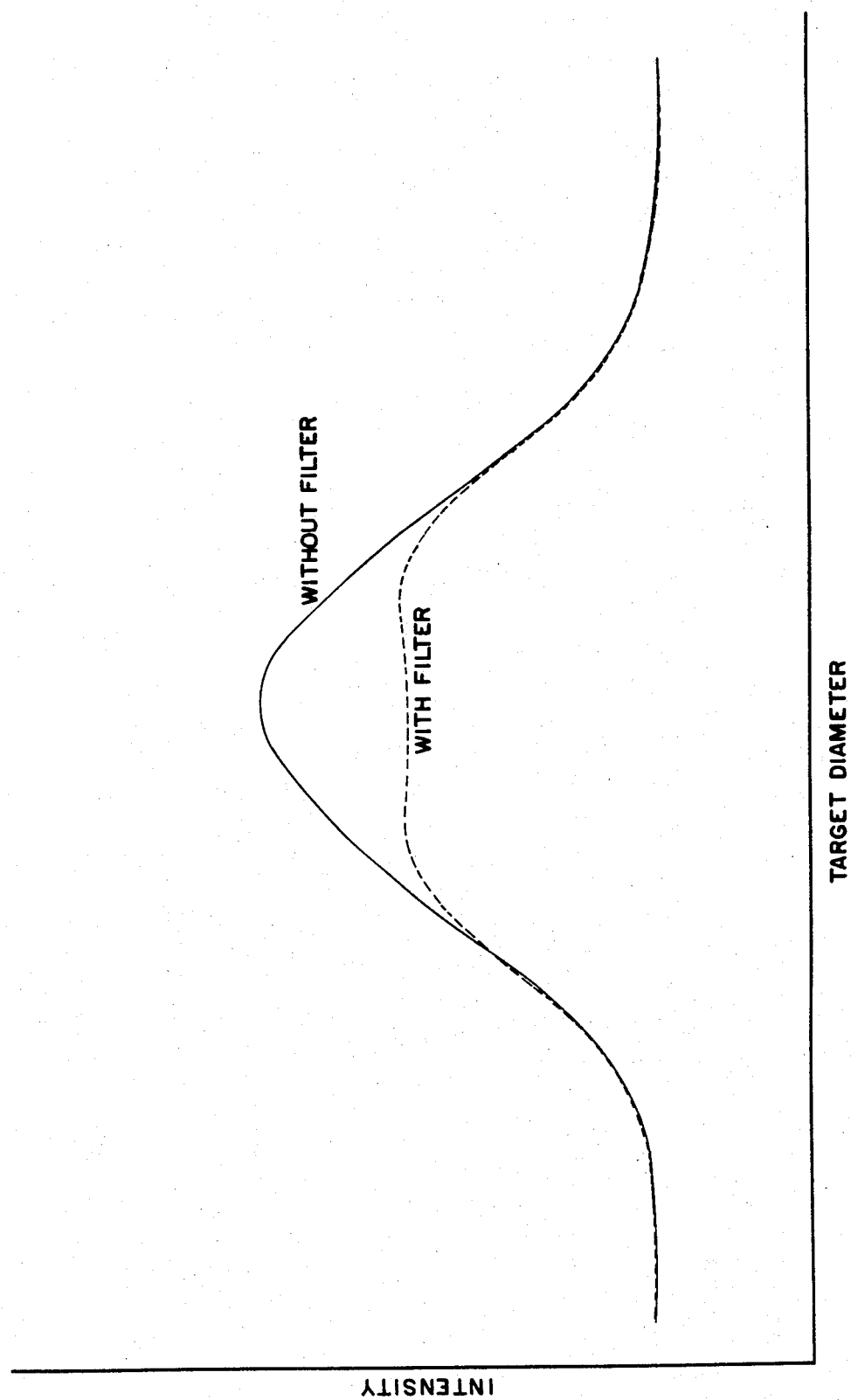
FIG. 3 is a scan of a laser beam profile with a 10X lens with and without an apodizing filter of the present invention.

FIG. 3 is a similar scan as described with reference to FIG. 2 except that a 10X lens was used. Again, it will be seen that the Gaussian distribution obtained without a filter is apodized with the filter of the present invention.

EXAMPLE 3

The emulsion of Example 1 was coated on a cellulose triacetate support with a wire-wound rod at a silver coverage of 202 mg/ft$^2$ and dried. Exposure was carried out as in Example 2 on separate sections of the emulsion for 14, 15, 16, 17, 18 and 19 seconds, respectively. The exposed emulsion was fixed and mounted as in Example 2. Scanning with a silicon diode photodetector showed the filter to be effective in converting the Gaussian intensity distribution of the beam to a more uniform distribution.

EXAMPLE 4

The emulsion of Example 1 was coated on a cellulose triacetate support with a wire wound rod at a silver coverage of 350 mg/ft$^2$ and dried. Exposure was carried out as in Example 2 on separate sections of the emulsion for 5, 6, 7, 8, 9, 10, 11, 12 and 13 seconds, respectively. The exposed emulsion was fixed and mounted as in Example 2. Scanning with a silicon diode photodetector showed the filter to be effective in converting the Gaussian intensity distribution of the beam to a more uniform distribution.

As stated above, an apodizing filter can comprise a plurality of filter areas of different densities so that the proper one can be matched to a given laser beam intensity. This is accomplished by mounting the apodizing filter on an X-Y translator in the laser beam and selecting the proper filter area with reference to the scanning detector.

Various changes and modifications can be made in the apodizing filter of the present invention and its use without departing from the spirit and scope of the invention. The various embodiments which have been disclosed herein were for the purpose of further illustrating the invention, but were not intended to limit it.

What is claimed is:

1. A laser beam apodizing filter comprising a laser beam transparent support carrying a print out silver image in terms of silver grains having a diameter of about 0.5 μm or less, said image being proportional in density distribution to the intensity distribution of said laser beam.

2. The product of claim 1 wherein said support is optical quality glass.

3. The product of claim 1 wherein said support is a non-birefringent plastic support.

4. The product of claim 1 wherein said image is laminated between optical quality glass plates.

5. A method for forming a laser beam apodizing filter which comprises exposing to the laser beam a print out silver halide emulsion carried on a support transparent to said laser beam, the silver halide grains of said silver halide emulsion being substantially uniform in diameter and having an average diameter of about 0.5 μm or less and a silver to gel ratio of greater than 1 and fixing the silver image formed in the thus-exposed emulsion, said silver image being substantially free of silver grains larger than said silver halide grains.

6. The method of claim 5 wherein said emulsion has an average grain size of about 0.4 μm.

7. The method of claim 5 wherein said emulsion is about 1–5 μm in thickness.

8. The method of claim 7 wherein said emulsion is about 2 μm in thickness.

9. The method of claim 5 wherein said support is optical quality glass.

10. The method of claim 6 wherein said support is a plastic support.

11. A laser diffraction imaging apparatus comprising: a laser; a beam splitter; a first mirror; and a second mirror; said beam splitter being disposed so as to split the light emanating from said laser such that a first portion is incident on said first mirror and a second portion is incident on said second mirror, a target; a first expansion lens and spatial filter disposed between said first mirror and said target in the path of laser light therebetween; a second expansion lens and spatial filter disposed in the laser beam path and between said second mirror and said target; wherein there is also disposed in said laser beam path an apodizing filter comprising a support transparent to said laser beam, said support carrying a print out silver image of silver grains having a diameter of about 0.5 μm or less, said image being proportional in density distribution to the intensity distribution of said laser beam.

12. The apparatus of claim 11 wherein said support is glass.

13. The apparatus of claim 11 wherein said support is a plastic support.

14. The apparatus of claim 13 wherein said image is laminated between optical quality glass plates.

15. The apparatus of claim 13 wherein both of said first and second paths contain an apodizing filter.

16. The apparatus of claim 13 wherein said apodizing filter is intermediate said laser and said beam splitter.

* * * * *